US006271767B1

United States Patent
Frye et al.

(10) Patent No.: US 6,271,767 B1
(45) Date of Patent: Aug. 7, 2001

(54) INDUCTIVELY COUPLED UNDERWATER MODEM

(75) Inventors: Daniel Frye; Alan Fougere, both of North Falmouth; Kenneth Doherty, Woods Hole; Neil Brown, West Falmouth, all of MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 0 days.

(21) Appl. No.: 08/434,898

(22) Filed: May 1, 1995

Related U.S. Application Data

(63) Continuation of application No. 07/957,198, filed on Oct. 5, 1992, now abandoned, and a continuation-in-part of application No. 07/669,426, filed on Mar. 14, 1991, now abandoned.

(51) Int. Cl.[7] .............................. G01V 3/00; G08C 19/06; H04Q 5/22
(52) U.S. Cl. .................................. 340/853.2; 340/853.8; 340/854.8; 340/870.31; 340/10.33
(58) Field of Search .............................. 73/170 A, 170 R, 73/170.29, 170.33, 170.34, 146.5; 320/13; 340/636, 825.54, 870.38, 853.2, 853.8, 854.8, 855.4, 855.5, 870.31, 10.33, 10.34

(56) References Cited

U.S. PATENT DOCUMENTS

| | | | |
|---|---|---|---|
| 3,314,009 | * 4/1967 | Murdock | 325/51 |
| 4,713,967 | * 12/1987 | Overs et al. | 73/170 A |
| 4,794,575 | * 12/1988 | Miller | 367/134 |
| 4,817,044 | * 3/1989 | Ogren | 364/550 |
| 4,924,698 | * 5/1990 | Echert et al. | 73/170 |
| 4,953,986 | * 9/1990 | Olson | 374/136 |
| 5,083,457 | * 1/1992 | Schultz | 73/146.5 |
| 5,095,308 | * 3/1992 | Hewitt | 340/825.44 |
| 5,200,743 | * 4/1993 | St Martin et al. | 340/825.07 |
| 5,686,902 | * 11/1997 | Reis et al. | 340/825.54 |

FOREIGN PATENT DOCUMENTS

1280321A * 12/1986 (SU).

OTHER PUBLICATIONS

D. E. Frye and B. Owens, "Recent Developments In Ocean Data Telemetry", Proceedings of the IEEE Fourth Working Conference on Current Measurement, Apr. 3–5, 1990, published Aug. 1990.

* cited by examiner

Primary Examiner—Andrew B. Christensen
(74) Attorney, Agent, or Firm—Irell & Manella LLP

(57) ABSTRACT

The present invention provides a subsurface instrument and a system for the collection and transmission of deep ocean data utilizing standard buoy mooring lines. The system includes a moored surface buoy and a submerged data collection instrument both inductively coupled to the buoy cable. The instrument has a transducer responsive to the characteristics of seawater. A slave modem is interconnected to the transducer through an A/D converter allowing analog transducer signals to be converted to standard telephone modem signals. The modem signals are inductively coupled into the mooring cable and received by a master modem located in the buoy. The buoy may contain a satellite transceiver allowing transmission of the signals to a remote location. The subsurface instrument is battery powered and battery life is extended by powering down when the instrument is not in use. Upon receipt of a signal from the master modem or an internal timer, a wake-up circuit in the instrument is activated causing the transmission of ocean data to be initiated.

1 Claim, 1 Drawing Sheet

INDUCTIVELY COUPLED UNDERWATER MODEM

CROSS REFERENCE TO RELATED APPLICATION

"This is a continuation of copending application Ser. No. 07/957,198 filed on Oct. 5, 1992", now abandoned.

This application is a continuation in part of U.S. Patent Application Ser. No. 07/669,426, filed Mar. 14, 1991, now abandoned.

BACKGROUND OF THE INVENTION

1. Field of the Invention

The present invention relates generally to the field of subsurface ocean data telemetry and in particular to a system utilizing a standard surface buoy mooring line as the transmission medium.

2. Description of the Prior Art

At the present time most in situ deep ocean data collected over any length of time are stored on magnetic tape or other recording medium in a subsurface instrument, and are not available until the instrument is recovered. However, the current availability of inexpensive satellite telemetry has prompted interest in developing a technique to permit near real time telemetering of oceanographic data from the deep ocean to the laboratory.

Solar powered radio transceivers mounted on surface ocean buoys are presently in use. These transceivers send telemetry data to satellite receivers and are useful for collecting ocean surface and weather information. Systems capable of sending subsurface oceanographic data to satellites over relatively long periods of time, however, are not known to be available. One problem with subsurface instruments is finding reliable means for the transfer of data between the instruments and a surface transceiver.

It has been proposed that the inductive properties of the cable on which subsurface instruments are suspended be used to transmit collected oceanographic data. Such a system is disclosed in U.S. Pat. No. 3,314,009 to Murdock in which an electrically insulated cable with a conductive core is lowered into the ocean by a ship. Multiple instruments are clamped onto the cable, which inductively transfer data into the cable. A receiver on the ship connected to the cable receives and records the information.

What is needed is a system which addresses the needs of in situ subsurface data collection utilizing existing buoy mooring lines and radio transmitters and receivers and which permits reliable transfer of oceanographic data for extended periods without the requirement of frequent battery replacement.

SUMMARY OF THE INVENTION

The preceding and other shortcomings of the prior art are addressed and overcome by the present invention which transmits data over standard mooring lines between a master and one or more slave modems and has a low power sleep mode to reduce power consumption when data is not being transferred.

In one aspect the invention provides an inductive modem telemetry instrument for measuring oceanographic data for use with an electrically insulated conductive cable immersed in seawater including a master modem inductively coupled to the cable, one or more transducers responsive to the characteristics measurable in seawater, slave modem means inductively coupling signals from the transducers through the cable to the master modem, and means for reducing power consumption of the instrument when signals are not being coupled from transducers to the master modem.

In another aspect, the invention provides an inductive modem telemetry system including an electrically insulated cable having a conductive core, the cable constructed to be immersed in seawater, an instrument removably attached to the cable at a preselected location for disposition in the seawater, a transducer in the sensor responsive to conditions in the seawater to generate electrical signals related thereto, a slave modem in the sensor interconnected with the transducer to generate modem encoded signals dependent upon the characteristics of signals received from the transducer, an inductive coupler in the sensor enveloping the cable and interconnected with the sending slave modem, the inductive coupler constructed to induce electrical signals in the center conductor of the cable in accordance with signals received from the slave modem, means for reducing power consumption of the transducer, slave modem and inductive coupler when signals are not being induced into the center conductor of the cable by the inductive coupler, and a master modem inductively coupled to the slave modem via the cable at one end portion using the seawater as a return path to receive signals from the slave modems via the cable.

In yet another aspect, the invention provides an inductive modem telemetry system including an electrically insulated cable having a conductive core, the cable constructed to be immersed in seawater, a sensor removably attached to the cable at a preselected location for disposition in the seawater, a transducer in the sensor responsive to the characteristics of the seawater to generate an electrical signal related to data to be collected, a slave modem in the sensor interconnected with the transducer to generate modem encoded signals dependent upon the data from the transducer, an inductive coupler in the sensor enveloping the cable and interconnected with the slave modem, the inductive coupler constructed to induce electrical signals in the center conductor of the cable in accordance with signals received from the slave modem and to receive signals in the center conductor, means for reducing power consumption of the transducer, slave modem and inductive coupler when signals are not being induced into the center conductor of the cable by the inductive coupler, and a master modem inductively coupled with the cable at one end portion thereof, using a seawater return path, to receive signals from and send signals to the slave modems by way of the cable.

These and other features and advantages of this invention will become further apparent from the detailed description that follows, which is accompanied by several drawing figures. In the figures and description, numerals indicate the various features of the invention, like numerals referring to like features throughout both the drawings and the description.

DETAILED DESCRIPTION OF THE PREFERRED EMBODIMENT

Figure 1:
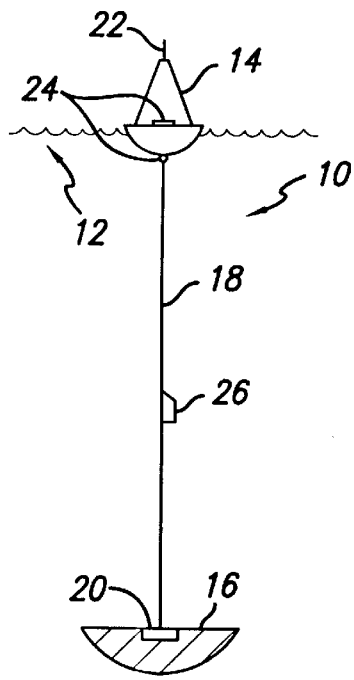
FIG. 1 is schematic view of a moored buoy and a subsurface instrument embodying principles of the current invention.

The present invention provides a subsurface inductive modem telemetry instrument and system for the collection and transmittal of real time deep ocean data utilizing satellite communications. The submerged instrument is capable of sending data to the ocean surface via existing mechanical mooring lines and may be used for extended periods of time.

A presently preferred embodiment of the invention includes system 10 for monitoring and transmitting data detectable in the ocean, such as characteristics of seawater 12, at various preselected depths. Buoy 14 is tethered to the ocean floor 16 by mooring cable 18 and anchor 20. Buoy 14 includes conventional satellite transceiver and antenna 22 which are powered by batteries that may be recharged if desired from solar cell arrays (not shown). Buoy 14 may receive as well as transmit information by means of transceiver 22 as is well known in the art of oceanographic data collection. In the present invention, buoy 14 additionally includes master modem 24 connected to transceiver 22. Master modem 24 is inductively coupled by means of mooring line 18 to one or more slave modems 52, in one or more remote instruments 26, as described below in greater detail.

One or more instruments 26, each including a slave modem 52, are attachable to mooring line 18 so that master modem 24 is inductively coupled to each such instrument 26 by its slave modem 52 which is itself inductively coupled to mooring line 18. One leg of the coupling or transformer loop uses the sea water return path through seawater 12. Each instrument 26 monitors one or more desired characteristics observable in seawater 12 and transfers data related thereto to master modem 24 through mooring line 18. The data may be then relayed from master modem 24 via transceiver and antenna 22 in any conventional manner to one or more orbiting communications satellites or other receiving facility.

Mooring line 18 may be a standard jacketed 3×19 wire rope or other typical insulated steel mooring cable. Such cables are suitable for standard modem communications because, when using seawater 12 as an electrical return path, they have a frequency versus attenuation response quite similar to that of twisted pair telephone cable. Small holes or cuts in the insulating jacket of mooring line 18 increases signal attenuation, but not to the point of blocking the signal so that long term communications are not prohibited by minor damage to the cable covering.

Figure 2:
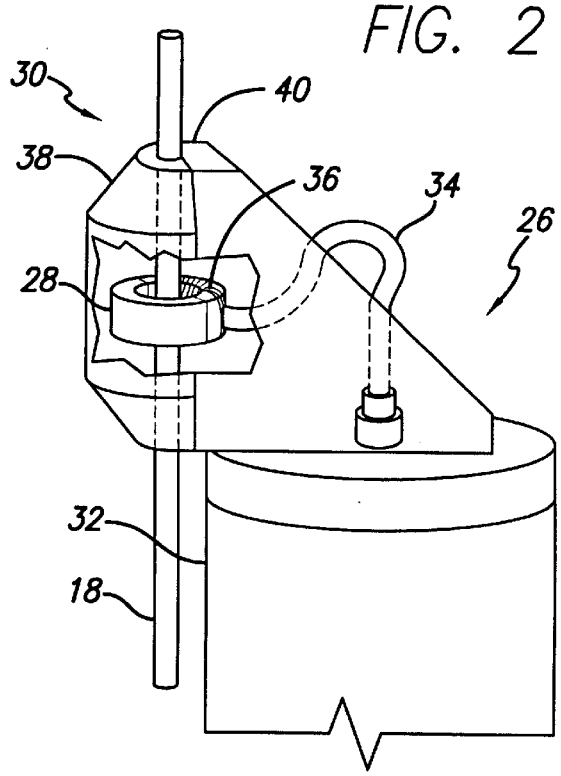
FIG. 2 is a partial pictorial representation of the subsurface instrument shown in FIG. 1, illustrating how the instrument is mechanically and inductively coupled to the mooring line.

FIG. 2, shows a portion of instrument 26, including split toroid 28 within clamp 30. Toroid 28 is exposed to the sea water and formed from a pair of ferromagnetic core halves, around at least one of which is wound winding 36. These halves are placed around mooring line 18 and fastened together to form a complete ferromagnetic core. Modem signals are transferred out of instrument housing 32 by cable 34 and into toroid 28 by winding 36. The same arrangement may conveniently be used for inductively coupling master modem 24 to mooring cable 18 by use of toroid 28 although a solid core, rather than a split core, may be used because mooring cable 18 may more conveniently be inserted through the core. The inductive coupling of the master modem may be connected by any convenient manner to the seawater return path, such as being exposed to the seawater below the buoy.

The modem signals passing through winding 36 induce a fluctuating magnetic field in and around toroid 28. This fluctuating magnetic field induces a corresponding fluctuating current in mooring line 18. Energy levels of the current induced in mooring line 18 are low, for example 0.1% or below that in toroid 28, but noise levels and cable attenuation are also low and the induced signals are detectable by other inductively coupled modems for thousands of meters along mooring line 18.

Clamp 30 is attachable to mooring line 18 at any preselected location without damage to mooring line 18. Clamp 30 preferably includes a pair of members 38 and 40 adapted to fit together to form a cylindrical passage. The inside diameter of the passage is slightly smaller than the outside diameter of mooring line 18. When clamp 30 is placed around mooring line 18, the passage thereby forms a snug fit between members 38 and 40 and mooring line 18. Members 38 and 40 may be held together by any common fastening means (not shown). For example, they may be hinged and held in a closed position by a latch, or they may be held together by screws passed through member 38 received into threaded openings in member 40. Members 36 and 38 serve to hold together core halves to form core 28 around insulated cable 18 while exposing core 28 to seawater 12.

Figure 3:
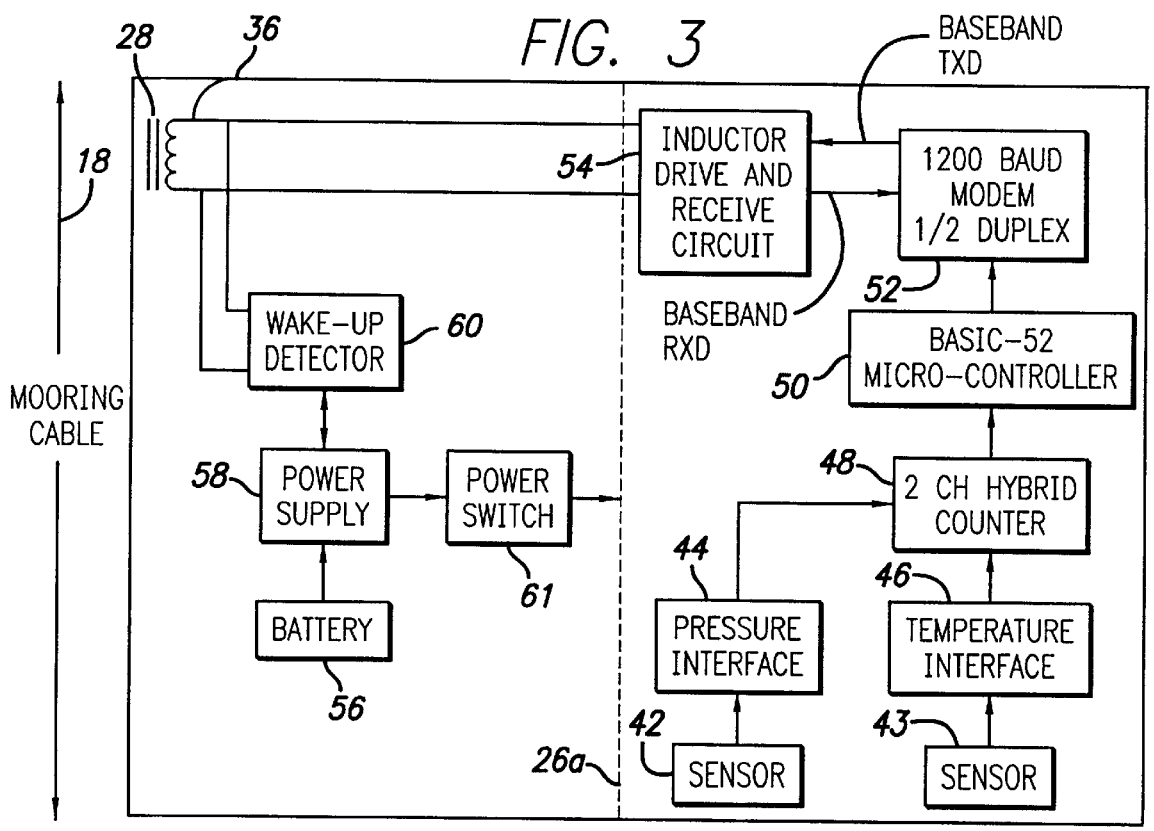
FIG. 3 is a block diagram of the electrical components of the instrument shown in FIG. 2.

An electronic block diagram of instrument 26 is shown in FIG. 3. Means are provided for sensing desired data from seawater 12, converting this data to modem signals and transferring the modem signals to master modem 24 through mooring line 18. A similar configuration is used in master modem 24 to detect the data and or send data to individual slave modems. Additional means are provided for regulating the amount of power consumed based on whether instrument 26 is sensing and transferring data to master modem 24 or is in a quiescent state. Signals may conveniently be transmitted from master modem 24 to the individual slave modems to control the quiescent state.

In a presently preferred embodiment, desired data such as seawater pressure and temperature, are measured and converted to a digital format by an analog-to-digital converter. This may be accomplished by sensors 42 and 43, which each provide an analog signal proportional to the characteristic being measured. The analog signals are converted to digital signals by interfaces 44 and 46, 2 channel hybrid counter 48 and basic-52 micro-controller 50 or other similar microprocessor.

The digitized signals are fed into slave modem 52 and are converted to standard telephone modem signals. In a presently preferred embodiment, slave modem 52 is a single chip integrated circuit of the type developed for the telephone industry. Slave modem 52 typically operates at 1200 Baud, ½ duplex, sending and receiving signals at $1200/2400$ Hz using FSK modulation. However, other telephone industry modem signal and baud rate standards may be used. Modem signals to and from slave modem 52 are amplified and matched to the impedance of toroid 28 by inductor drive and receive circuit 54.

The electronic components 26A of instrument 26 are powered by battery 56 and power supply 58. The supply of battery power, is controlled by power switch 61.

An important aspect of the present invention is that it may be operated for relatively long periods of time. Wake-up detector 60 is provided to extend the serviceable life of battery 56. When instrument 26 is not sending data to master modem 24, power to the electronic components of instrument 26 is significantly reduced or shut off. Only wake-up detector 60 remains fully operational. Wake-up detector 60 is interconnected between winding 36 and power supply 58. Upon receipt of a signal from master modem 24, wake-up detector 60 causes full power to be supplied to the electronics of instrument 26 and data transfer between instrument 26 and master modem 24 commences. Wake-up detector 60 may also controlled by an internal timer causing data transfer to commence at preselected intervals. Power requirements for the presently preferred embodiment of the invention are typically 200 microwatts when active and 1 microwatt when powered down.

In operation, instrument 26 is normally in a quiescent state, conserving the life of battery 56. Data collection and transfer is typically initiated by master modem 24, under the control of a timer or in response to a command received from a satellite transceiver. When activated, master modem 24 sends a signal to instrument 26 to commence sending data by coupling that signal through mooring cable 18. If more than one instrument 26 is clamped to mooring line 18, each instrument 26 responds to a unique address and master modem 24 transmits an addressed signal to a specific instrument 26 to commence transmission of data from that instrument 26. Wake-up detector 60 receives and decodes the signal and causes the electronics of instrument 26 to be powered up. The desired characteristics of seawater 12 surrounding instrument 26 may then by sensed and transferred to master modem 24. This data is relayed by master modem 24 to a satellite receiver or may be stored for later transfer upon receipt of a satellite command.

Having now described the invention in accordance with the requirements of the patent statutes, those skilled in this art will have no difficulties making changes and modifications in the embodiment of the individual elements of the invention in order to meet their specific requirements or conditions. Such changes and modifications may be made with out departing from the scope and spirit of the invention as set forth in the following claims.

What is claimed is:

1. An inductive modem telemetry system for use in collecting data in seawater, the system comprising:

an electrically insulated wire rope immersed in seawater;

a plurality of subsurface instruments removably attached to the wire rope at preselected locations;

master modem means for inductively coupling a plurality of subsurface instrument specific wake-up command signals to each subsurface instrument through the wire rope with a return path through the seawater;

a transducer in each subsurface instrument to generate a data signal related to the data to be collected;

a slave modem in each subsurface instrument interconnected with the transducer to generate modem encoded signals related to the data signal, and receive modem encoded signals from the master modem;

an inductive coupler in each subsurface instrument enveloping the wire rope and interconnected with the slave modem, the inductive coupler constructed to induce and receive electrical signals in accordance with the modem encoded signals in a signal path to the master modem including substantially equal length path legs in the wire rope and in the seawater;

switch means in each subsurface unit operable in a sleep mode for reducing power consumption of the subsurface instrument by removing power from the transducer and slave modem; and a continuously powered wake-up detector in each subsurface instrument for operating the switch means to apply power to the transducer and the slave modem in response to the wake-up signal specific to that subsurface instrument.

* * * * *